United States Patent
Kawamoto et al.

(10) Patent No.: US 7,388,637 B2
(45) Date of Patent: Jun. 17, 2008

(54) METHOD FOR PRODUCING FILM WITH TILTED ALIGNMENT, FILM WITH TILTED ALIGNMENT, AND IMAGE DISPLAY USING SAME

(75) Inventors: Ikuo Kawamoto, Ibaraki (JP); Hironori Motomura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 22 days.

(21) Appl. No.: 10/547,527

(22) PCT Filed: Mar. 5, 2004

(86) PCT No.: PCT/JP2004/002801

§ 371 (c)(1),
(2), (4) Date: Jul. 6, 2006

(87) PCT Pub. No.: WO2004/079417

PCT Pub. Date: Sep. 16, 2004

(65) Prior Publication Data

US 2006/0257649 A1    Nov. 16, 2006

(30) Foreign Application Priority Data

Mar. 6, 2003 (JP) ............................ 2003-060534
Mar. 3, 2004 (JP) ............................ 2004-058941

(51) Int. Cl.
*G02F 1/1337* (2006.01)
*B32B 17/06* (2006.01)
*B32B 27/08* (2006.01)

(52) U.S. Cl. ...................... 349/123; 349/187; 349/126; 428/336; 428/500; 428/426

(58) Field of Classification Search ................ 349/123, 349/187, 188, 189, 190, 191, 192, 193, 158, 349/126, 129, 56, 62; 428/336, 500, 426, 428/447; 156/241
See application file for complete search history.

(56) References Cited

U.S. PATENT DOCUMENTS

| | | | |
|---|---|---|---|
| 6,905,640 B2 | 6/2005 | Tanaka | |
| 7,135,211 B2* | 11/2006 | Shuto et al. | 428/1.3 |
| 2006/0127603 A1* | 6/2006 | Kim et al. | 428/1.1 |
| 2006/0170851 A1* | 8/2006 | Kawamoto | 349/123 |
| 2006/0257649 A1* | 11/2006 | Kawamoto et al. | 428/336 |

FOREIGN PATENT DOCUMENTS

| | | |
|---|---|---|
| JP | 8-5838 | 1/1996 |
| JP | 8-338913 | 12/1996 |
| JP | 9-61624 | 3/1997 |
| JP | 2000-284286 | 10/2000 |
| JP | 2000-327720 | 11/2000 |
| JP | 2002-214431 | 7/2002 |
| JP | 2002-214610 | 7/2002 |
| JP | 2002-328371 A | 11/2002 |

* cited by examiner

*Primary Examiner*—Brian M Healy
(74) *Attorney, Agent, or Firm*—Westerman, Hattori, Daniels & Adrian, LLP.

(57) ABSTRACT

An obliquely oriented liquid crystal layer and an obliquely oriented film is provided by performing a rubbing treatment on a homeotropically orienting substrate and, after the rubbing treatment, applying a liquid crystal coating solution containing at least one of a homeotropically orienting liquid crystal composition and a photopolymerizable liquid crystal composition on the homeotropically orienting substrate.

19 Claims, 1 Drawing Sheet

METHOD FOR PRODUCING FILM WITH TILTED ALIGNMENT, FILM WITH TILTED ALIGNMENT, AND IMAGE DISPLAY USING SAME

FIELD OF THE INVENTION

The present invention relates to a method for producing an obliquely oriented film, an obliquely oriented film, or an obliquely oriented liquid crystal layer. The obliquely oriented film produced by the production process of the invention or an obliquely oriented liquid crystal layer peeled from the obliquely oriented film can be used as, for example, optical compensation films such as retardation films and viewing angle compensation films and optical films such as elliptically-polarizing films obtained by laminating the above optical compensation films and polarizing plates, solely or in combination with the other film. These films can be used in image display devices such as liquid display devices (LCD), electroluminescence display devices (ELD), plasma displays (PD), and field emission displays (FED). In particular, the obliquely oriented film of the invention is effective for optical compensation of LCD.

BACKGROUND ART

An LCD realizes image display by controlling light irradiated from a backlight by various methods. For example, a liquid crystal panel controlling transmission state of light, a polarizing plate transmitting a polarized light selectively, an optical compensation film for enhancing reproducibility of color display and viewing angle properties, and the like are used. Of these, the optical compensation film controls retardation of reflective index possessed by a film by stretching a polymer film or coating an organic material to enable optical compensation according to various requests. For example, in LCD having a liquid crystal panel in which the liquid crystal-acting mode is a TN mode or an STN mode, various viewing angle widening techniques are used for compensating narrowness characteristic to the modes. For example, there are known a method using an alignment dividing means, a half-tone means or the like for averaging pixels while separating the pixels into a plurality of regions having different directions of liquid crystal molecular alignment, a method using a convergent lens or a divergent lens, a method using a viewing angle compensating film, and a method of radically improving the liquid crystal operating mode such as IPS, MVA or OCB. Among these methods, the method of improving the liquid crystal operating mode and the method using a viewing angle compensating film are simpler and have been aggressively put into practice.

Especially, the method using a viewing angle compensating film is simpler than the method of changing and improving the liquid crystal operating mode, because an optical compensating film integrated with a polarizing plate can be stuck to a liquid crystal panel without any change of the liquid crystal panel. That is, this method is a technique by which widening of the viewing angle can be achieved at low cost. A film having oblique discotic liquid crystal inclined or a film having oblique rod-like nematic liquid crystal is known as the viewing angle compensating film. In either case, a liquid crystal polymer is obliquely oriented (e.g. see Patent Document 1). There are also known an obliquely oriented film using a side chain-type liquid crystal polymer (e.g. see Patent Document 2) and a method using an optically oriented film as a nematic polymerizable liquid crystal compound exhibiting homeotropic (perpendicular) orientation to form an obliquely oriented liquid crystal layer (e.g. see Patent Document 3).

However, in the conventional methods, obliquely oriented liquid crystal layers having a relatively small degree of obliquity are only obtained and it is difficult to obtain an obliquely oriented film having a large degree of obliquity. In addition, there is commonly known a method of increasing a degree of obliquity by increasing the thickness of the obliquely oriented liquid crystal layer but the orientation state becomes unstable with the increase of the thickness and thus it is difficult to control the thickness. Thus, unless an obliquely oriented liquid crystal layer having a large degree of obliquity can be stably obtained, a retardation range capable of optical compensation of LCD and the like is limited. Therefore, it has been desired to stably obtain an obliquely oriented film comprising an obliquely oriented liquid crystal layer having a large degree of obliquity.

Patent Document 1: JP 8-5838 A
Patent Document 2: JP 2000-327720 A
Patent Document 3: JP 2002-214610 A

DISCLOSURE OF THE INVENTION

In the invention, it is an object to provide a method for producing an obliquely oriented film which has a large degree of obliquity and is easy to control and stable, and an obliquely oriented film, as well as an image display device using the obliquely oriented film. Once the film of the invention is obtained, since the optical compensation range is broadened, it becomes possible to respond more flexibly to the applications such as viewing angle compensation.

As a result of the extensive studies for solving the above problems, the present inventors have found that the above object can be achieved by the following method and thus, they have accomplished the invention.

Namely, the invention is a method for producing an obliquely oriented film, comprising: performing a rubbing treatment on a homeotropically orienting substrate; and, after the rubbing treatment, applying a liquid crystal coating solution containing at least one of a homeotropically orienting liquid crystal composition and a photopolymerizable liquid crystal composition on the homeotropically orienting substrate to form an obliquely oriented liquid crystal layer. Moreover, the process may be a method for producing two or more layers, i.e., a plurality of obliquely oriented liquid crystal layers are formed by further applying the liquid crystal coating solution.

Furthermore, the invention relates to a method for producing an obliquely oriented film, which comprising: laminating the obliquely oriented liquid crystal layer and an optical film through at least one adhesive layer; and removing the homeotropically orienting substrate.

In the obliquely oriented film obtained by the above production process, a degree of obliquity is preferably 30 or more, provided that the degree of obliquity is calculated as $$(|\Delta nd(-30) - \Delta nd(+30)|/\Delta nd(0)) \times 100$$

wherein $\Delta nd(0)$ is the front retardation, $\Delta nd(+30)$ and $\Delta nd(-30)$ are retardations in a direction inclined at $\pm 30°$ toward a slow axis, respectively.

Furthermore, the invention relates to an obliquely oriented film comprising an obliquely oriented liquid crystal layer comprising at least one of a homeotropically orienting liquid crystal composition and a photopolymerizable liquid crystal composition, wherein a degree of obliquity is 30 or more, provided that the degree of obliquity is calculated as $$(|\Delta nd(-30)-\Delta nd(+30)|/\Delta nd(0))\times 100$$

wherein $\Delta nd(0)$ is the front retardation, $\Delta nd(+30)$ and $\Delta nd(-30)$ are retardations in a direction inclined at ±30° toward a slow axis, respectively. Moreover, two or more layers of the above obliquely oriented liquid crystal layer may be laminated one another.

The invention relates to an optical film having the above obliquely oriented film and an image display device having the above obliquely oriented film or the above optical film.

Therefore, the invention can provide a method for producing an obliquely oriented film, comprising rubbing a homeotropically orienting substrate and, after the rubbing, applying a liquid crystal coating solution containing at least one of a homeotropically orienting liquid crystal composition and a photopolymerizable liquid crystal composition on the homeotropically orienting substrate to form an obliquely oriented liquid crystal layer, and an obliquely oriented film. Since the above obliquely oriented film is produced by a production method capable of stable production and has a larger degree of obliquity as before, viewing angle compensation and the other optical compensation can be more highly and more effectively carried out by using it in an image display device such as a liquid display device appropriately in combination with an optical film such as polarizing plate.

Moreover, the invention provides an obliquely oriented film having a larger degree of obliquity by forming an obliquely oriented liquid crystal layer containing a homeotropically orienting liquid crystal composition or a photopolymerizable liquid crystal composition. Furthermore, by laminating two or more layers of the obliquely oriented liquid crystal layers, an obliquely oriented film having a larger degree of obliquity than that of the obliquely oriented film formed by one obliquely oriented liquid crystal layer is stably provided. With such obliquely oriented films, viewing angle compensation and the other optical compensation can be more highly and more effectively carried out by using it in an image display device such as a liquid display device appropriately in combination with an optical film such as a polarizing plate.

BEST MODE FOR CARRYING OUT THE INVENTION

The invention is findings that oblique orientation having a larger degree of obliquity is obtained by forming a liquid crystal coating solution containing a homeotropically orienting liquid crystal composition or a photopolymerizable liquid crystal composition.

The constitution of the obliquely oriented film according to the invention has an obliquely oriented liquid crystal layer comprising a liquid crystal coating solution containing a homeotropically orienting liquid crystal composition or a photopolymerizable liquid crystal composition formed on a homeotropically orienting substrate. For effectively utilizing the optical properties of the obliquely oriented liquid crystal layer, the above obliquely oriented film having the homeotropically orienting substrate may be used as it is or the obliquely oriented liquid crystal layer may be solely used after peeling the homeotropically orienting substrate from the obliquely oriented film. In particular, in view of durability and easy handling, it is preferable to use the obliquely oriented film as it is or to use it, after lamination with another optical film and then peeling of the homeotropically orienting substrate from the obliquely oriented film, in a laminated state of the obliquely oriented liquid crystal layer on the above optical film.

The oblique orientation of the obliquely oriented liquid crystal layer possessed by the obliquely oriented film of the invention requires that an oblique angle of a nematic liquid crystal molecule of the obliquely oriented liquid crystal layer is 1° to 85° with respect to the direction normal to a surface of the homeotropically orienting substrate. A degree of obliquity at that time is determined according to the following expression using retardation values measured in the normal direction (front direction) of the obliquely oriented film and at a position inclined at ±30° from the normal direction along with the slow axis direction.

$$\text{Degree of obliquity}=(|\Delta nd(-30)-\Delta nd(+30)|/\Delta nd(0))\times 100$$

wherein $\Delta nd(0)$ is the front retardation, $\Delta nd(+30)$ and $\Delta nd(-30)$ are retardations in a direction inclined at ±30° toward a slow axis, respectively.

Figure 1:
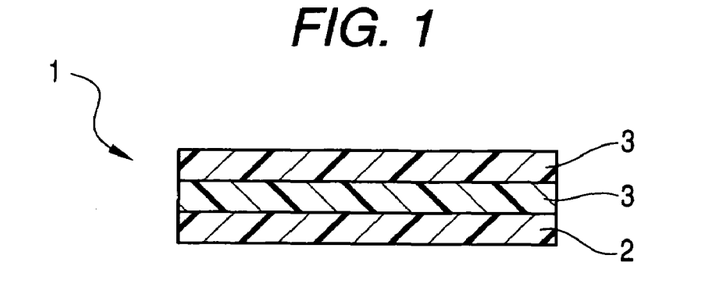
FIG. 1 is a cross-sectional view of one embodiment of the obliquely oriented film of the invention.

The degree of obliquity according to the invention is sufficiently 30 or more but since a larger degree of obliquity enables a broader optical compensation, the degree of obliquity is preferably 50 or more, more preferably 150 or more. Furthermore, in the case that two or more layers of the obliquely oriented liquid crystal layers are laminated, an obliquely oriented film having a larger degree of obliquity is obtained. For example, in the case that two layers of the obliquely oriented liquid crystal layers are laminated, an obliquely oriented film having a degree of obliquity of 250 or more can be obtained and in the case that three layers of the obliquely oriented liquid crystal layers are laminated, it is easy to obtain an obliquely oriented film having a degree of obliquity of 500 or more. However, when number of layers of such an obliquely oriented liquid crystal layer increases or the thickness of the layer increases, accuracy of the alignment decreases and control for obtaining a desired obliquely oriented liquid crystal layer also becomes difficult. Therefore, in the case that the obliquely oriented liquid crystal layer comprises one layer thereof, the practical degree of obliquity is preferably 500 or less, more preferably 250 or less. In the case that the obliquely oriented liquid crystal layer comprises two layers or more thereof, the practical degree of obliquity is preferably 1000 or less, more preferably 800 or less. The number of the layers to be laminated is preferably four layers or less and lamination of two layers is particularly preferable. FIG. 1 shows one embodiment of the obliquely oriented film of the invention. In the obliquely oriented film 1, two layers of the obliquely oriented liquid crystal layer 3 are laminated on the homeotropically orienting substrate 2.

As the homeotropically orienting substrate, for example, substrates comprising various materials such as polymers, glass, and metals can be used and the homeotropically orienting substrate is not particularly limited as far as a homeotropic liquid crystal composition is homeotropically oriented thereon without rubbing the homeotropically orienting substrate. In the case that the homeotropic liquid crystal composition is difficult to homeotropically orient on the above substrate alone, an alignment layer capable of achieving homeotropic alignment of the homeotropic liquid crystal composition is provided on the above substrate, and the combination of the substrate and the alignment layer is used as the homeotropically orienting substrate. Specifically, it is preferable to use a polymer film having a norbornene structure or a glass substrate solely or a substrate wherein an alignment layer containing a glassy macromolecule, a silane coupling agent, or a surfactant is provided on a polymer film. Of these, in order to be practical and stable, particularly preferred is a polymer film having a norbornene structure or a substrate wherein an alignment layer containing a glassy macromolecule, a silane coupling agent, or a surfactant is provided on a polymer film. A thickness of the homeotropically orienting substrate is usually from about 10 to 1000 µm.

In the case of using a polymer film as a substrate, the film is not particularly limited as far as it does not generate inconvenience in surface state of the film and durability by temperature for aligning liquid crystals. For example, there may be mentioned films formed of transparent polymers, e.g., polyester based polymers, such as polyethylene terephthalate and polyethylene naphthalate; cellulose based polymers, such as diacetyl celluloses and triacetyl celluloses; polycarbonate based polymers; and acrylic polymers, such as polymethyl methacrylates; and the like. Moreover, there may also be mentioned films formed of transparent polymers, e.g., styrene based polymers, such as polystyrenes and acrylonitrile-styrene copolymers; olefin based polymers, such as polyethylenes, polypropylenes, polyolefines having cyclic or norbornene structure, and ethylene-propylene copolymers; vinyl chloride based polymers; amide polymers, such as aromatic polyamides; and the like. Furthermore, there may be mentioned films formed of transparent polymers, e.g., imide polymers, sulfone based polymers, polyether sulfone based polymers, polyether ether ketone based polymers, polyphenylene sulfide based polymers, vinyl alcohol based polymers, polyphenylene sulfide based polymers, vinyl alcohol based polymers, vinylidene chloride based polymers, vinyl butyral based polymers, allylate based polymers, polyoxymethylene based polymers, and epoxy based polymers, and blends of the above-mentioned polymers. Among the above-mentioned films, polymer films having a high degree of hydrogen bond and usually usable as transmission films, such as triacetyl celluloses, polycarbonates, polyethylene terephthalate, and norbornene polyolefins may preferably be used. Moreover, as a substrate having homeotropically aligning properties by itself, there may be mentioned polymer films having a norbornene structure, for example.

As a polymer films having a norbornene structure, there may be exemplified by ZEONOR (trade name, manufactured by Zeon Corporation), ZEONEX (trade name, manufactured by Zeon Corporation), and ARTON (trade name, manufactured by JSR) etc., which have optically excellent characteristics. Such plastic films have a very small optical anisotropy, and hence the obliquely oriented film comprising the above homeotropically orienting liquid crystal composition or photopolymerizable liquid crystal composition formed on the polymer film having a norbornene structure can be used as an obliquely oriented film as it is without transferring the obliquely oriented liquid crystal layer to another optical film as an optical film for applications for optical compensation of liquid crystal displays.

As the metal substrate, chemically stable ones such as aluminum and stainless steel are preferably used. As the glass substrate, any glass may be used regardless of the classification of alkali glass and non-alkali glass but from optical viewpoints, non-alkali glass is preferable.

As the alignment layer to be provided on the above substrate, a thin layer comprising a substance such as a glassy macromolecule, a silane coupling agent, a surfactant, or a silicone, which are capable of homeotropical alignment of the homeotropically orienting liquid crystal composition, is provided. Moreover, these substances may be contained on the substrate surface or in the substrate or may be contained in the homeotropically orienting liquid crystal composition. Of these, a glassy macromolecule or a silane coupling agent can be preferably used in the invention.

As materials for forming an alignment layer containing a glassy macromolecule, a metal alkoxide sol, in particular a metal silicon alkoxide sol may preferably be used. Metal alkoxides are usually used as an alcoholic solution. After the above solution is applied on the substrate, the solvent is removed and the sol-gel reaction is accelerated by heating, thereby a transparent glassy macromolecule being formed on the substrate. A metal silicon alkoxide gel layer is formed from a metal silicon alkoxide sol. Specifically, there may be exemplified a glassy macromolecule alignment layer formed from an isopropyl alcohol-2% butanol solution of ethyl silicate (manufactured by Colcoat: Colcoat P). As methods for coating the above metal alkoxide sol solution on the substrate, for example, a roll coating method, a gravure coating method, a spin coating method, a bar coating method, and the like may be adopted. As methods for solvent removal or promotion of reaction, a drying at room temperatures, a drying with a drying furnace, a heating on a hot plate, and the like may usually be utilized. Since a homogeneous and flexible film is required, a thickness of the alignment layer is preferably about 0.04 to 2 µm, more preferably about 0.05 to 0.2 µm.

As the silane coupling agent, commercially available ones comprising organic substances having silicon and a linear alkyl group and the like can be used without limitation. In the invention, there can be used preferably those having an acryloxy group or methacryloxy group and, for example, particularly preferably those formed from acryloxypropyltrimethoxysilane.

As treatment with a surfactant, there is known a method of applying an amphipathic surfactant. For example, there are known methods of applying an organic solvent of lecithin, hexadeyltrimethylammonium bromide, or the like and treating a substrate with a solution of a monobasic carboxylic acid-chromium complex. Particularly, in the invention, substances having an isocyanate group or a silanol group and an acryloyl group or a methacrloyl group are preferable. Of these, those having an isocyanate group and a methacryloyl group or those having a silanol group and an acryloyl group are particularly preferable. In the invention, it is preferable to use lecithin or methacryloxyethyl isocyanate.

As the rubbing treatment, there may be used conventionally known methods, for example, a method of rubbing in one direction with a rubbing roll wound with a fabric made of fine fibers of rayon, cotton, or the like or a leather material.

The liquid crystal coating solution which forms the obliquely oriented liquid crystal layer of the invention contains a homeotropically orienting liquid crystal composition or a photopolymerizable liquid crystal composition, and the homeotropically orienting liquid crystal composition may contain a photopolymerizable liquid crystal composition. Furthermore, auxiliaries such as a crosslinking agent, a photopolymerization initiator, or a silane coupling agent may be mixed therewith.

The homeotropically orienting liquid crystal composition is not particularly limited as far as it exhibits a homeotropically aligning property on a homeotropically orienting substrate which is not subjected to rubbing. Thus, there may be preferably used a polymer, a polymerizable monomer, or a mixture of a polymer and a polymerizable monomer, which exhibit nematic liquid crystallinity.

As the homeotropically orienting liquid crystal composition which exhibits a homeotropically aligning property on a homeotropically orienting substrate, for example, there may be preferably used a composition comprising a side chain-type liquid crystal polymer containing a monomer unit (a) containing a liquid crystal fragment side chain and a monomer unit (b) containing a non-liquid crystal fragment side chain, and a photopolymerizable liquid crystal composition exhibiting nematic liquid crystallinity which is mixed with the side chain-type liquid crystal polymer.

The side chain-type liquid crystal polymer to be preferably used in the invention exhibits a homeotropically aligning property on a homeotropically orienting substrate without using a commonly known homeotropically aligning film such as a vapor deposition film. In general, since an aligning film such as a vapor deposition film remarkably loses an alignment-directing power when subjected to rubbing treatment, the film is not suitable for rubbing treatment. Therefore, as described in the invention, an obliquely oriented liquid crystal layer can be formed by applying, after the surface of the homeotropically orienting substrate is subjected to rubbing treatment, a homeotropically orienting liquid crystal composition containing a side chain-type liquid crystal polymer which exhibits a homeotropically aligning property.

The above side chain-type liquid crystal polymer has a monomer unit (b) containing a non-liquid crystal fragment side chain having an alkyl chain or the like, in addition to the monomer unit (a) containing a liquid crystal fragment side chain which is possessed by a common side chain-type liquid crystal polymer. Thus, it is surmised that, by the action of the monomer unit (b) containing a non-liquid crystal fragment side chain, the polymer is converted into a liquid crystalline state by heat treatment without using any homeotropically aligning film, whereby a nematic liquid crystalline phase is realized and a homeotropically aligning property is exhibited.

The above monomer unit (a) has a side chain having nematic liquid crystallinity and a monomer unit represented by the formula (1) may be mentioned, for example.

(Formula 1)

wherein $R^1$ represents a hydrogen atom or a methyl group, a represents a positive integer of 1 to 6, $X^1$ represents a $-CO_2-$ group or a $-OCO-$ group, $R^2$ represents a cyano group, an alkoxy group having 1 to 6 carbon atoms, a fluorine group, or an alkyl group having 1 to 6 carbon atoms, and b and c each represents an integer of 1 or 2.

Moreover, the monomer unit (b) has a linear side chain and a monomer unit represented by the following formula (2) or (3) may be mentioned, for example.

(Formula 2)

wherein R3 represents a hydrogen atom or a methyl group, R4 represents an alkyl group having 1 to 22 carbon atoms, or a fluoroalkyl group having 1 to 22 carbon atoms.

(Formula 3)

wherein d represents a positive integer of 1 to 6, and R5 represents an alkyl group having 1 to 6 carbon atoms.

Moreover, the ratio of the monomer unit (a) to the monomer unit (b) is not particularly limited and varies depending on the kind of the monomer units. When the ratio of the monomer unit (b) increases, the side chain-type liquid crystal polymer does not exhibit a liquid crystal monodomain-aligning property, so that it is preferable to satisfy the following relation: (b)/{(a)+(b)}=0.01 to 0.8 (molar ratio). In particular, the value is preferably 0.1 to 0.5.

Furthermore, as the homeotropically orienting liquid crystal composition, there may be also used a side chain-type liquid crystal polymer containing a monomer unit (a) containing the above liquid crystal fragment side chain and a monomer unit (c) containing a liquid crystal fragment side chain having an alicyclic cyclic structure.

According to the above side chain-type liquid crystal polymer, homeotropic alignment of the liquid crystal polymer can be realized on a homeotropically orienting substrate. The side chain-type liquid crystal polymer has the monomer unit (c) containing a liquid crystal fragment side chain having an alicyclic cyclic structure, in addition to the monomer unit (a) containing a liquid crystal fragment side chain which is possessed by a common side chain-type liquid crystal polymer. It is surmised that, by the action of the monomer unit (c), the polymer is converted into a liquid crystalline state by heat treatment without using any homeotropically aligning film, whereby a nematic liquid crystal phase is realized and a homeotropically aligning property is exhibited.

The above monomer unit (c) has a side chain exhibiting nematic liquid crystallinity and a monomer unit represented by the following formula (4) may be mentioned, for example.

(Formula 4)

wherein $R^6$ represents a hydrogen atom or a methyl group, h represents a positive integer of 1 to 6, $X^2$ represents a —$CO_2$— group or a —OCO— group, e and g each represents an integer of 1 or 2, f represents an integer of 0 to 2, and $R^7$ represents a cyano group or an alkyl group having 1 to 12 carbon atoms.

Moreover, the ratio of the monomer unit (a) to the monomer unit (c) is not particularly limited and varies depending on the kind of the monomer units. When the ratio of the monomer unit (c) increases, the side chain-type liquid crystal polymer does not exhibit a liquid crystal monodomain-aligning property, so that it is preferable to satisfy the following relation: (c)/{(a)+(c)}=0.01 to 0.8 (molar ratio). In particular, the value is preferably 0.1 to 0.6.

The liquid crystal polymer capable of constituting the homeotropically orienting liquid crystal composition is not limited to those having the monomer units exemplified in the above and also the monomer units exemplified in the above can be suitably combined.

The weight average molecular weight of the above side chain-type liquid crystal polymer is preferably 2,000 to 100,000. By adjusting the weight average molecular weight within such a range, performance as a liquid crystal polymer is exhibited. Since too small weight average molecular weight of the above side chain-type liquid crystal polymer tends to result in poor film-forming ability of the alignment layer, it is more preferable that the weight average molecular weight is 2,500 or more. On the other hand, since too large weight average molecular weight tends to result in a poor aligning property as a liquid crystal and to be difficult to form a homogeneous aligning state, it is more preferable that the weight average molecular weight is 50,000 or less.

Incidentally, the side chain-type liquid crystal polymer exemplified in the above can be prepared by copolymerizing acrylic monomers or methacrylic monomers corresponding to the above monomer units (a), (b), and (c). In this connection, the monomers corresponding to the above monomer units (a), (b), and (c) can be synthesized by known methods. The preparation of the copolymer can be carried out in accordance with the usual polymerization modes with acrylic monomers and the like, such as a radical polymerization mode, a cation polymerization mode, and an anion polymerization mode. In the case that a radical polymerization mode is applied, various polymerization initiators can be used. Of these, those decomposing at an intermediary temperature which is a decomposition temperature not high and not low, such as azobisisobutyronitrile and benzoyl peroxide, are preferably used.

In the invention, the above side chain-type liquid crystal polymer can be used as the homeotropically orienting liquid crystal composition but the above side chain-type liquid crystal polymer may be mixed with a photopolymerizable liquid crystal composition to form a homeotropically orienting liquid crystal composition. Moreover, the above photopolymerizable liquid crystal composition can be also used solely.

As the photopolymerizable liquid crystal composition, liquid crystalline compounds having at least one unsaturated double bond such as an acryloyl group or a methacryloyl group and exhibiting nematic liquid crystallinity are preferably used. As such a photopolymerizable liquid crystal composition, acrylates or methacrylates which may be the above monomer unit (a) can be exemplified. As photopolymerizable liquid crystal composition, in order to enhance durability, those having two or more photopolymerizable functional groups are preferable. As such a photopolymerizable liquid crystal composition, for example, a crosslinking nematic liquid crystal monomer represented by the following formula 5 can be exemplified.

(Formula 5)

wherein R represents a hydrogen atom or a methyl group, A and D each independently represents a 1,4-phenylene group or a 1,4-cyclohexylene group, X each independently represents a —COO— group, a —OCO— group or a —O— group, B represents a 1,4-phenylene group, a 1,4-cyclohexylene group, a 4,4'-biphenylene group, or a 4,4'-bicyclohexylene group, and m and n each independently represents an integer of 2 to 6.

Moreover, as the photopolymerizable liquid crystal composition, compounds wherein the terminal "$H_2C$=CR—$CO_2$—" in the above formula 5 is replaced by a vinyl ether group or an epoxy group and compounds wherein "—$(CH_2)_m$—" and/or "—$(CH_2)_n$—" are replaced by "—$(CH_2)_3$—C*H($CH_3$)—$(CH_2)_2$—" or "—$(CH_2)_2$—C*H($CH_3$)—$(CH_2)_3$—" can be exemplified.

The above photopolymerizable liquid crystal composition can be converted into a liquid crystalline state to realize, for example, a nematic liquid crystal phase with homeotropic alignment or oblique orientation together with the side chain-type liquid crystal polymer by heat treatment. Thereafter, by polymerizing or crosslinking the photopolymerizable liquid crystal composition, durability of the resulting liquid crystal film can be enhanced.

The ratio of the photopolymerizable liquid crystal composition to the side chain-type liquid crystal polymer in the above homeotropically orienting liquid crystal composition is not particularly limited but is suitably determined in consideration of the durability of the resulting liquid crystal film and the like. The ratio of the photopolymerizable liquid crystal composition:the side chain-type liquid crystal polymer is usually about 0.1:1 to 30:1, particularly preferably 0.5:1 to 20:1, more preferably 1:1 to 10:1.

The liquid crystal coating solution using the above photopolymerizable liquid crystal composition usually contains a photopolymerization initiator. As the photopolymerization initiator, various ones can be used without particular limitation. As the photopolymerization initiator, for example, Irgacure 907, Irgacure 184, Irgacure 651, Irgacure 369, and the like manufactured by Ciba Specialty Chemicals can be exemplified. The amount of the photopolymerization initiator to be added may be such that the alignment is not disturbed in consideration of the kind of the photopolymerizable liquid crystal composition, the mixing ratio of the homeotropically orienting liquid crystal composition, and the like. Usually, about 0.5 to 30 parts by weight is preferable relative to 100 parts by weight of the photopolymerizable liquid crystal composition. In particular, 3 to 15 parts by weight is preferable.

At the time when a liquid crystal coating solution containing a homeotropically orienting liquid crystal composition or a photopolymerizable liquid crystal composition is applied on the above homeotropically orienting substrate, there may be mentioned a solution coating method using a solution in which the above liquid crystal composition is dissolved in a solvent or a method of melt-coating by melting the liquid crystal composition. Of these, a method of coating the solution on the homeotropically orienting substrate by the solution coating method is preferable.

Solvents to be used for preparing the above solution are dependent on the kinds of side chain-type liquid crystal polymers, photopolymerizable liquid crystalline compounds, or homeotropically orienting substrates, and for example, there may be used halogenated hydrocarbons, such as chloroform, dichloromethane, dichloroethane, tetrachloroethane, trichloroethylene, tetrachloroethylene, and chlorobenzene; phenols, such as phenol and para-chlorophenol; aromatic hydrocarbons, such as benzene, toluene, xylene, methoxybenzene, 1,2-dimetoxybenzene; and other solvents, such as acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pyrrolidone, pyridine, triethylamine, tetrahydrofuran, dimethylformamide, dimethylacetamide, dimethyl sulfoxide, acetonitrile, butyronitrile, and carbon disulfide. A concentration of the solution is dependent on solubility of side chain type liquid crystal polymer materials to be used and a thickness of liquid crystal film finally aimed at, and is not unconditionally limited but usually in a range of 3 to 50% by weight, and preferably 7 to 30% by weight.

A thickness of the obliquely oriented liquid crystal layer formed of the liquid crystal coating solution containing the homeotropically orienting liquid crystal composition or the photopolymerizable liquid crystal composition is preferably about 1 to 10 μm. Moreover, in the case that precise control of the thickness of the obliquely oriented liquid crystal layer is necessary, since a stage of coating onto a substrate almost determines the thickness, control of the concentration of the solution, the thickness of the coating film, and the like needs to be especially carefully performed.

As methods for coating the solution containing the homeotropically orienting liquid crystal composition or the photopolymerizable liquid crystal composition adjusted to a desired concentration using the above solvent on a rubbed homeotropically orienting substrate, for example, a roll coating method, a gravure coating method, a spin coating method, a bar coating method, etc. may be used. After coating, a solvent is removed to form a layer of the homeotropically orienting liquid crystal composition or the photopolymerizable liquid crystal composition. Conditions for removal of the solvent is not particularly limited as long as most of the solvent is removed, or the liquid crystal polymer layer or the liquid crystalline composition layer do not flow around nor flow down. Usually, the solvent is removed using methods, such as drying at room temperatures, drying in a drying furnace, and heating on a hot plate.

Subsequently, the layer of the liquid crystal coating solution on a homeotropically orienting substrate is made in a liquid crystal state and is aligned. For example, heat treatment is performed so as to give the liquid crystal composition or the photopolymerizable liquid crystalline composition within a liquid crystal temperature range, and they are aligned in liquid crystal state. The heat treatment method can be performed by the same method as the above-mentioned drying methods. The heat treatment temperature is varied depending on the kinds of the liquid crystal coating liquids, and homeotropically orienting substrates to be used, and is not limited but usually is in a range of 60 to 300° C., and preferably 70 to 200° C. Moreover, the heat treatment period of time is varied depending on the heat treatment temperature, and the kinds of the homeotropically orienting liquid crystal compositions or the photopolymerizable liquid crystal compositions and kinds of homeotropically orienting substrates to be used, and usually, but not limited to, is in a range of 10 seconds to 2 hours, and preferably of 20 seconds to 30 minutes. When the heat treatment period of time is shorter than 10 seconds, there is a possibility that formation of alignment may not adequately advance. When the period is longer than 2 hours, there is a possibility that the aligned state is not maintained.

After heat treatment, it is preferable to fix the aligned state. As the method of fixation, there are mentioned curing by cooling to glass transition temperature or lower and polymerization curing by light irradiation. One or both of these methods are suitably used depending on the properties of the homeotropically orienting liquid crystal composition or the photopolymerizable liquid crystal composition. In general, the curing by cooling is effective for polymers and the polymerization curing by light irradiation for polymerizable monomers. It is preferable to use these methods in combination.

Displacing the obliquely oriented film after heat treatment into a room temperature atmosphere from a heating atmosphere during the heat treatment operation may perform the curing by cooling. Forced cooling, such as by air-cooling and by water-cooling, may be performed. By cooling the obliquely oriented liquid crystal layer to a temperature not higher than the glass transition temperature of the homeotropically orienting liquid crystal composition or the photopolymerizable liquid crystal composition, alignment thereof is fixed.

In particular, in the case of using a photopolymerizable liquid crystal composition or in the case that the above homeotropically orienting liquid crystal composition contains a photopolymerizable liquid crystal composition, the photopolymerizable liquid crystal composition is polymerized or cross-linked by light irradiation to fix the photopolymerizable liquid crystalline composition, resulting in an obliquely oriented film having improved durability. Light irradiation is, for example, UV irradiation. In order to accelerate the reaction adequately, UV irradiation conditions are preferably in inert gas atmosphere. Usually, a high pressure mercury ultraviolet lamp having illumination of approximately 80 to 160 mW/cm$^2$ is typically used. Lamps of another kind, such as meta-halide UV lamp and incandescent tube, may also be used. Moreover, adjustment of temperatures is adequately performed by cooling treatments by cold mirror, water cooling, and others or by increase in line velocities so as to give a surface temperature of the liquid crystal layer upon UV irradiation within a liquid crystal temperature range.

The obliquely oriented liquid crystal layer thus formed can be used after lamination of two or more layers thereof. In the case of the lamination of two or more layers, the degree of freedom at the time when the degree of obliquity is designed can be broadened by suitably adjusting the kind and thickness of the liquid crystalline composition of each layer and the method of forming the obliquely oriented liquid crystal layer. For example, generally, in order to obtain an obliquely oriented liquid crystal layer having a large degree of obliquity, it is necessary to increase the thickness of the layer. However, when a thick obliquely oriented liquid crystal layer is formed, homogeneous drying and alignment are difficult and uneven drying and uneven alignment are apt to occur. On the other hand, when two or more layers of the obliquely oriented liquid crystal layer are laminated, it is possible to obtain an obliquely oriented liquid crystal layer having a larger degree of obliquity than that of the obliquely oriented liquid crystal layer designed as one layer having equal thickness, and thus a liquid crystal layer can be obtained, which is more homogeneous as compared with a thick one layered obliquely oriented liquid crystal layer having an equal degree of obliquity.

In order to obtain two or more layers of the obliquely oriented liquid crystal layer as described above, the liquid crystal layer may be formed suitably using the above method or conventionally known methods. For example, there may be mentioned a method of forming an aligning film on the formed obliquely oriented liquid crystal layer and then applying a liquid crystal composition, a method of directly applying a liquid crystal composition on the formed obliquely oriented liquid crystal layer and aligning the composition utilizing the alignment-directing ability possessed by the liquid crystal layer, a method of applying a liquid crystal composition after rubbing the surface of the formed obliquely oriented liquid crystal layer, and the like method. Particularly, in the invention, since the surface of the formed obliquely oriented liquid crystal layer has an alignment-directing ability, it is preferable to apply a liquid crystal layer directly on the obliquely oriented liquid crystal layer.

The obliquely oriented film thus obtained may be used as it is but the obliquely oriented liquid crystal layer obtained by peeling the homeotropically orienting substrate from the obliquely oriented film may be laminated on another optical film for use as an obliquely oriented film. Moreover, there may be used the obliquely oriented liquid crystal layer alone obtained by peeling off the homeotropically orienting substrate from the obliquely oriented film at the interface with the obliquely oriented liquid crystal layer.

Figure 2:
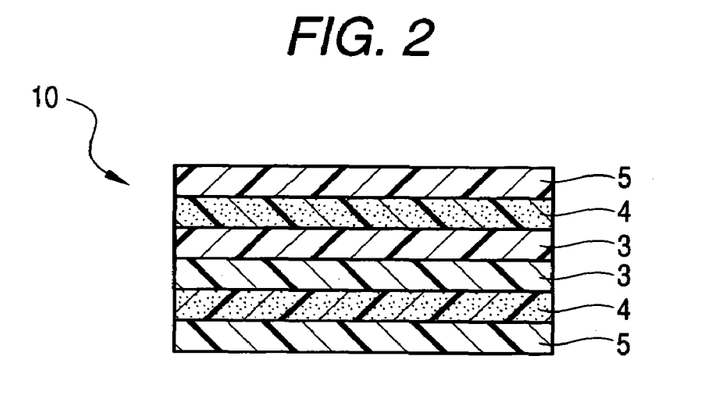
FIG. 2 is a cross-sectional view of another embodiment of the obliquely oriented film of the invention.

In the case that the homeotropically orienting substrate is peeled off from the obliquely oriented film, an adhesive layer is formed at one side or both sides of the obliquely oriented liquid crystal layer of the obliquely oriented film and the obliquely oriented liquid crystal layer of the obliquely oriented film and an optical film are laminated each other. Thereafter, it is preferable that the homeotropically orienting substrate is peeled off from the obliquely oriented film at the interface with the obliquely oriented liquid crystal layer and then the layer is used as an obliquely oriented film comprising the optical film, the adhesive layer, and the obliquely oriented liquid crystal layer. At that time, each layer of the optical film, the adhesive layer, and the obliquely oriented liquid crystal layer may be one layer or tow or more layers and may be suitably laminated. FIG. 2 shows another embodiment of the obliquely oriented film of the invention. The obliquely oriented film 10 of the present embodiment is produced by peeling off the homeotropically orienting substrate 2 from the obliquely oriented film 1 in FIG. 1 and laminating the optical film 5 through the adhesive layer 4 at both sides thereof.

Moreover, when the optical film is formed of a releasing film and the obliquely oriented liquid crystal layer is transferred onto the releasing film, the resulting film can be used as an obliquely oriented film comprising the obliquely oriented liquid crystal layer and the adhesive layer because the releasing film can be used after releasing according to the use of the obliquely oriented liquid crystal layer.

Adhesives or pressure-sensitive adhesives for forming the adhesive layers are not particularly limited unless they adversely affect required optical properties. For example, adhesives or pressure-sensitive adhesives using acrylic based polymers, silicone based polymers, polyesters, polyurethanes, polyamides, polyethers, and polymers, such as fluorine based and rubber based, as base polymer can be suitably selected to be used. Moreover, the form is not particularly limited and various adhesives or pressure-sensitive adhesives of solvent types, dispersion types, emulsion types, and the like can be employed. Especially, adhesives having excellent optical transparency, excellent weather resistance, such as acrylic based adhesives, may preferably be used.

Suitable methods may be used for formation of adhesive layer. As an example, there may be mentioned a method in which a base polymer or a composition thereof is dissolved or dispersed in a solvent comprising an independent suitable solvent or a mixture thereof, such as toluene or ethyl acetate to prepare an adhesive solution with about 10 to 40% by weight of concentration, and the obtained solution is then directly applied on the above liquid crystal layer by suitable developing methods, such as flow casting method and coating method, or a method in which an adhesive layer formed on a separator according to the above-mentioned method is transferred on the liquid crystal layer. Moreover, in the adhesive layer, for example, resins of natural product or synthesized product, in particular resins that give pressure sensitive adhesiveness, additives to be added to an adhesive layer, such as fillers comprising glass fibers, glass beads, metal powders, other inorganic powders, etc., pigments, colorants, and antioxidants may be incorporated. In addition, the adhesive layer may be an adhesive layer including micro particles to give an optical diffusing ability.

The optical film is not particularly limited as far as it is a polymer film, a liquid crystal film, or an optical film obtained by laminating two or more layers of a liquid crystal layer having necessary optical properties. For example, there may be mentioned a polarizing plate, an optical compensation film (a retardation plate, a viewing angle compensation film, etc.), a brightness enhancement film, a cholesteric liquid crystal film, a releasing film, and the like.

As the polarizing plate, there may be mentioned, for example, a plate obtained by adhering protective sheet(s) on one side or both sides of a polarizer comprising a polyvinyl alcohol based film containing a dichromatic substance or the like through a suitable adhesive layer comprising a vinyl alcohol based polymer.

As the method for producing the polarizer, there may be mentioned, for example, a method of dyeing a polyvinyl alcohol based film with iodine and then stretching the film to align the iodine.

The polarizer is not particularly limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; polyene type alignment films, such as dehydrated polyvinyl alcohol and dehydrochlorinated polyvinyl chloride, etc. may be mentioned. Of these, a polarizer comprising a polyvinyl alcohol type film and a dichromatic material such as iodine is suitably used. Although thickness of polarizer is not particularly limited, the thickness of about 5 to 80 μm is commonly adopted.

A polarizer may contain boric acid or zinc sulfate or zinc chloride, or the like, if necessary, and may be dipped in an aqueous solution of potassium iodide or the like.

The materials for forming protective sheet(s) provided on one side or both sides of the polarizer preferably have excellent transparency, mechanical strength, and heat stability, water shielding property, and excellent isotropy. For example, polyester based polymers, such as polyethylene terephthalate and polyethylenenaphthalate; cellulose based polymers, such as diacetyl cellulose and triacetyl cellulose; acrylic polymer, such as polymethyl methacrylate; styrene based polymers, such as polystyrene and acrylonitrile-styrene copolymer (AS resin); polycarbonate based polymer may be mentioned. Besides, as examples of the polymer forming a protective sheet, polyolefin based polymers, such as polyethylene, polypropylene, polyolefin that has cyclo-based or norbornene structure, ethylene-propylene copolymer; vinyl chloride based polymer; amide based polymers, such as nylon and aromatic polyamide; imide based polymers; sulfone based polymers; polyether sulfone based polymers; polyether-ether ketone based polymers; polyphenylene sulfide based polymers; vinyl alcohol based polymer; vinylidene chloride based polymers; vinyl butyral based polymers; allylate based polymers; polyoxymethylene based polymers; epoxy based polymers; or blend polymers of the above-mentioned polymers may be mentioned. The protective sheet may be formed as a cured layer of heat curing type or ultraviolet ray curing type resins, such as acryl based, urethane based, acryl urethane based, epoxy based, and silicone based, etc. Of these, cellulose based polymers are preferable.

Moreover, as is described in Japanese Patent Laid-Open Publication No. 2001-343529 A (WO 01/37007), polymer films, for example, resin compositions including (A) thermoplastic resins having substituted and/or unsubstituted imido group in side chain, and (B) thermoplastic resins having substituted and/or unsubstituted phenyl and nitrile group in side chain may be mentioned. As an illustrative example, a film may be mentioned that is made of a resin composition containing an alternating copolymer comprising isobutene and N-methylmaleimide, and an acrylonitrile-styrene copolymer. A film made of a mixed extruded product of resin compositions etc. may be used.

A thickness of the protective sheet is not particularly limited but, in general, 500 μm or less preferably 1 to 300 μm and more preferably 5 to 200 μm. Moreover, in view of polarizing properties and durability, the surface of the protective film is preferably saponified with an alkali.

Moreover, it is preferable that the protective sheet may have as little coloring as possible. Accordingly, a transparent protective sheet having a retardation value in a film thickness direction represented by $Rth=[(nx+ny)/2-nz]\times d$ of $-90$ nm to $+75$ nm (wherein nx and ny represent principal refraction indices in a film plane, nz represents refractive index in a film thickness direction, and d represents a film thickness) may be preferably used. Thus, coloring (optical coloring) of polarizing plate resulting from a transparent protective film may mostly be cancelled using a protective sheet having a retardation value (Rth) of $-90$ nm to $+75$ nm in a thickness direction. The retardation value (Rth) in a thickness direction is more preferably from $-80$ nm to $+60$ nm, and especially preferably from $-70$ nm to $+45$ nm.

As the above protective sheet, two of them to be laminated to the both sides of the polarizer each may have different properties. Examples of the properties may include but not limited to thickness, material, light transmittance, tensile modulus, or presence of an optical film.

The above polarizing plate can be used after subjected to various processing at practical use. The method of processing is not particularly limited but there may be mentioned, for example, hard coat processing, or antireflection processing, surface processing aiming at sticking prevention, diffusion or anti glare performed onto the surface on which the polarizing film of the above transparent protective film has not been adhered surface not provided with the above adhesive-applied layer) and a method of laminating a liquid crystal layer aiming at viewing angle compensation or the like. Moreover, there may be also mentioned those containing one layer or two or more layers of optical films laminated thereon for use in the formation of a liquid crystal display device and the like, such as a reflective plate, a translucent plate, a retardation plate (including wavelength plate (λ plate) of ½ and ¼), and viewing angle compensation film.

The above hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. The antireflection processing is applied for the purpose of antireflection of outdoor daylight on the surface of a polarizing plate and it may be prepared by forming an antireflection film according to the conventional method etc. Besides, the sticking prevention processing is applied for the purpose of adherence prevention with an adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising crosslinked or non-crosslinked polymers may be used. When forming fine concavo-convex structure on the surface, the amount of fine particle used is usually from about 2 to 70 parts by weight relative to 100 parts by weight of the transparent resin that forms the fine concavo-convex structure on the surface, and preferably from 5 to 50 parts by weight. An antiglare layer may also serve as a diffusion layer (viewing angle expanding function etc.) for diffusing transmitting light through the polarizing plate and expanding a viewing angle etc.

In this connection, the optical films such as the above-mentioned antireflection layer, sticking prevention layer, diffusion layer, and antiglare layer may be built in the transparent protective film itself, and also they may be prepared as separate ones different from the transparent protective film The adhesion processing of the above polarizer with the transparent protective film is not particularly limited but can be carried out, for example, through an adhesive comprising a vinyl polymer or an adhesive comprising at least a water-soluble crosslinking agent of a vinyl alcohol type polymer, such as boric acid or borax, glutaraldehyde or melamine, or oxalic acid. The adhesive layer may be formed as a coated dry layer of an aqueous solution or the like and other additives and catalysts such as acid can be also mixed, if necessary, at the preparation of the aqueous solution.

A reflection type polarizing plate comprises a reflective layer provided on a polarizing plate and is used for manufacturing a liquid crystal display in which an incident light from a viewing side (display side) is reflected to give a display. This type of plate does not require a built-in light sources, such as a backlight, and has an advantage that a liquid crystal display may easily be made thinner. A reflection type polarizing plate may be formed using suitable methods, such as a method in which a reflective layer made of metal etc. is, if required, attached to one side of a polarizing plate through a transparent protective layer etc.

As an illustrative example of a reflection type polarizing plate, a plate may be mentioned on which, if required, a reflective layer is formed using a method of attaching a foil and vapor deposition film of reflective metals, such as aluminum, to one side of a matte treated transparent protective film. Moreover, a plate with a fine concavo-convex structure on the surface obtained by mixing fine particle into the above-mentioned transparent protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a transparent protective film may be formed by a method of attaching a metal to the surface of a transparent protective layer directly using, for example, suitable methods of a vacuum evaporation method, such as a vacuum deposition method, an ion plating method, and a sputtering method, and a plating method.

Instead of a method in which a reflection plate is directly given to the transparent protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a transparent protective film or a polarizing plate etc. when used, from a viewpoint of preventing deterioration in reflectance by oxidation, of maintaining an initial reflectance for a long period of time and of avoiding preparation of a protective layer separately etc.

In addition, a semi-transmissive polarizing plate may be obtained by preparing the above-mentioned reflective layer as a transflective type reflective layer, such as a half-mirror etc. that reflects and transmits light. A semi-transmissive polarizing plate is usually prepared in the backside of a liquid crystal cell and it may form a liquid crystal display unit of a type in which a picture is displayed by an incident light reflected from a view side (display side) when used in a comparatively well-lighted atmosphere and this unit displays a picture, in a comparatively dark atmosphere, using embedded type light sources, such as a backlight built in backside of a semi-transmissive polarizing plate. That is, the semi-transmissive polarizing plate is useful to obtain of a liquid crystal display device of the type that saves energy of light sources, such as a backlight, in a well-lighted atmosphere, and can be used with a built-in light source if needed in a comparatively dark atmosphere etc.

When a retardation plate is further laminated to the polarizing plate, an elliptically polarizing plate or a circularly polarizing plate is formed. The retardation plate or the like is used in the case that a linearly polarized light is changed into an elliptically polarized light or a circularly polarized light, an elliptically polarized light or a circularly polarized light is changed into a linearly polarized light with a retardation plate, or a polarizing direction of a linearly polarized light is changed. Especially, as retardation plates that change a linearly polarized light into a circularly polarized light, or a circular polarized light into a linearly polarized light, a so-called quarter wavelength plate (also referred to as $\lambda/4$ plate is used. A half wavelength plate (also referred to as $\lambda/2$ plate) is usually used, when changing a polarizing direction of a linearly polarized light.

An elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display device. Furthermore, a polarizing plate in which three-dimensional refractive index is controlled may also preferably compensate (prevent) coloring produced when a screen of a liquid crystal display device is viewed from an oblique direction. Circularly polarizing plate is effectively used, for example, when adjusting a color tone of a picture of a reflection type liquid crystal display device that provides a colored picture, and it also has function of antireflection.

As retardation plates, there may be mentioned birefringent films obtained by uniaxially or biaxially stretching polymer materials, aligned films comprising liquid crystal polymers, those in which aligned layers of liquid crystal polymers are supported with film, and the like. The stretching may be effected by roll stretching, stretching along a long gap, tenter stretching, tubular stretching, and the like, for example. The stretching ratio is generally about 1.1 to 3 times in the case of uniaxial stretching. The thickness of the retardation plate is not particularly limited but generally is 10 to 200 µm, preferably 20 to 100 µm.

Examples of the above polymer materials include polyvinyl alcohol, polyvinylbutyral, polymethyl vinyl ether, polyhydroxyethyl acrylate, hydroxyethyl cellulose, hydroxypropyl cellulose, methyl cellulose, polycarbonates, polyallylates, polysulfones, polyethylene terephthalate, polyethylene naphthalate, polyether sulfones, polyphenylene sulfide, polyphenylene oxide, polyallyl sulfones, polyvinyl alcohol, polyamides, polyimides, polyolefins, polyvinyl chloride, cellulose type polymers, and binary or ternary various copolymers, graft copolymers, and blends thereof. These polymer materials are converted into oriented materials (stretched films) by stretching or the like.

As the above liquid crystal polymer, there may be mentioned, for example, various ones of main chain types or side chain types wherein a conjugate linear atomic group (mesogen) imparting a liquid crystal-aligning property is introduced into the main chain or side chain. Specific examples of the main chain type liquid crystal polymer include nematic aligning polyester type liquid crystal polymers, discotic polymers, and cholesteric polymers, which have a structure wherein a mesogen group is bonded at a spacer part imparting flexibility. Specific examples of the side chain type liquid crystal polymers include those containing a polysiloxane, a polyacrylate, a polymethacrylate, or a polymalonate as a main chain skeleton and having a mesogen part comprising a para-substituted cyclic compound unit imparting nematic alignment through a spacer part comprising a conjugate atomic group as a side chain. These liquid crystal polymers can be applied by developing a solution of the liquid crystal polymer on the oriented surface such as rubbed surface of thin film of a polyimide or polyvinyl alcohol formed on a glass plate or one obtained by oblique evaporation of silicon oxide, followed by heat treatment.

The retardation plate may be those having suitable retardation corresponding to purposes for usage, such as those used for the purpose of compensation for coloring or viewing angle, etc. owing to birefringence caused by various wavelength plates or liquid crystal layers. Moreover, two or more kinds of retardation plates may be laminated, and thus optical properties, such as retardation, may be controlled.

In addition, the above elliptically polarizing plate or the reflection type elliptically polarizing plate is obtained by laminating a polarizing plate or a reflection type polarizing plate and a retardation plate in a suitable combination. Such an elliptically polarizing plate or the like may be formed by sequentially separately laminating them during the process of a liquid crystal display device so as to be a combination of a (reflection type) polarizing plate and a retardation plate. However, an optical film such as an elliptically polarizing plate formed beforehand as described above has an advantage that it is excellent in stability of quality and lamination operability and thus may improve production efficiency of liquid crystal display devices and the like.

A viewing angle compensation film is a film for expanding viewing angles in order to give a comparatively clear image in the case where a screen of a liquid crystal display is observed from a little diagonal direction not vertical to the screen. Such a viewing angle compensation retardation plate comprises one supporting an alignment layer such as a liquid crystal polymer on a retardation plate, an aligned film of a liquid crystal polymer or the like, or a transparent substrate. For the usual retardation plate, polymer films having birefringence which are uniaxially stretched in the plane direction is used. However, for the retardation plate to be used as the viewing angle compensation film, polymer films having birefringence which are biaxially stretched in the plane direction, two-directionally stretched films such as films having birefringence which are uniaxially stretched in the plane direction and also stretched in the thickness directions and wherein refractive index in the thickness direction is controlled and obliquely oriented films may be used. As obliquely oriented films, for example, there may be mentioned a film obtained by a method in which a heat shrinking film is adhered to a polymer film, then the combined film is stretched and/or shrunk under a condition of being influenced by a heat-shrinking force, or a film being aligned in an oblique direction. A viewing angle compensation film can be appropriately combined for the purpose of prevention of coloring by a variation of visual recognition angles based on retardation by a liquid crystal cell etc., and of expansion of a viewing angle providing excellent visibility etc.

Besides, a compensation retardation plate in which an optical anisotropy layer consisting of an alignment layer of liquid crystal polymer, especially consisting of an obliquely oriented liquid crystal layer of discotic liquid crystal polymer is supported with triacetyl cellulose film may preferably be used from a viewpoint of attaining a wide viewing angle with good visibility.

A brightness enhancement film shows a characteristic that reflects linearly polarized light with a predetermined polarization axis, or circularly polarized light with a predetermined direction, and that transmits other light, when natural light by backlights of a liquid crystal display device or by reflection from a back-side comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the back-side and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result, brightness may be improved. That is, in the case that the light enters through a polarizer from backside of a liquid crystal cell by the backlight etc. without using a brightness enhancement film, most of the light, with a polarization direction different from the polarization axis of the polarizer, is absorbed by the polarizer, and does not transmit through the polarizer. This means that although influenced with the characteristics of the polarizer used, about 50% of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By repeating the entering and re-entering processes, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display device to achieve a bright screen.

A diffusing plate may also be provided between the brightness enhancement film and the above described reflective layer, etc. A polarized light reflected by the brightness enhancement film goes to the above reflective layer etc., and the diffusing plate installed diffuses passing light uniformly and changes the light state into non-polarized state through depolarization at the same time. That is, the diffusing plate returns polarized light to natural light state. Steps are repeated where light in the non-polarized state, i.e., natural light state, goes to the reflective layer and the like, reflects through the reflective layer and the like, and again goes into the brightness enhancement film again passing through the diffusing plate. By installing the diffusing plate that returns polarized light to the natural light state, a uniform and bright screen may be provided while maintaining brightness of display screen, and simultaneously controlling non-uniformity of brightness of the display screen. By installing the diffusing plate that returns polarized light to the natural light state, it is considered that number of repetition times of reflection of a first incident light increases with sufficient degree to provide a uniform and bright display screen conjointly with the diffusion function of the diffusing plate.

The suitable films are used as the above-mentioned brightness enhancement film. Namely, for example, multi-layer thin film of a dielectric substance; a laminated film that has the characteristics of transmitting a linearly polarized light with a predetermined polarizing axis and of reflecting other light, such as the multilayer laminated film of the thin film having a different refractive-index; a film that has the characteristics of reflecting a circularly polarized light with either left-handed or right-handed rotation and transmitting other light, such as an aligned film of a cholesteric liquid crystal polymer or a film on which the aligned cholesteric liquid crystal layer is supported; and the like may be used.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid crystal layer, the light may be entered into a polarizer as it is, but it is desirable to enter the light into a polarizer after changing the circularly polarized light to a linearly polarized light through a retardation plate, taking control an absorption loss into consideration. In this connection, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation plate working as a quarter wavelength plate to a monochromatic light with a wavelength of 550 nm is laminated with a retardation plate having other retardation characteristics, such as a retardation plate working as a half-wavelength plate. Therefore, the retardation plate located between a polarizing plate and a brightness enhancement film may consist of one or more retardation plates.

In addition, also in a cholesteric liquid crystal film, a film reflecting a circularly polarized light in a wide wavelength ranges, such as a visible-light band, may be obtained by adopting a configuration structure in which two or more layers with different reflective wavelength are laminated together. Thus, a transmitted circularly polarized light in a wide wavelength range may be obtained based thereon.

Moreover, the above polarizing plate may consist of multi-layered film of laminated layers of a polarizing plate and two of more of optical films as the above-mentioned separated type polarizing plate. Therefore, the polarizing plate may be a reflection type elliptically polarizing plate or a transflective type elliptically polarizing plate, etc. in which the above-mentioned reflection type polarizing plate or a semi-transmissive polarizing plate is combined with the retardation plate.

The optical film wherein the above optical film is laminated on a polarizing plate may be formed by sequentially separately laminating them during the method for producing a liquid crystal display device. However, an optical film formed beforehand by lamination has an advantage that it is excellent in stability of quality and assembly operability and thus may improve production efficiency of liquid crystal display devices and the like. For the lamination, a suitable adhesion means such as an adhesive layer may be employed. At the adhesion of the above polarizing plate and the other optical film, the optical axis thereof may be arranged at a suitable angle depending on the aimed retardation properties.

As the constituting material of the releasing film, suitable thin layer materials such as synthetic resin films including polyethylene, polypropylene, and polyethylene terephthalate, rubber sheets, paper, fabrics, non-woven fabrics, nets, foamed sheets, metal foils, and laminates thereof can be employed. Moreover, in order to enhance releasing ability from the adhesive layer, the surface of the releasing film may be treated with silicone, a long-chain alkyl, fluorine, or the like.

The above obliquely oriented film or the above obliquely oriented liquid crystal layer or an optical film using the same is used front surface of a flat light source having a reflective layer at the backside in lighting devices to be used for image display devices and the like. The above lighting devices preferably have at least one prism array layer and more preferably have two or more prism array layers in a state that the arranged directions of the arrays in upper and lower layers are crossed each other.

Figure 3:
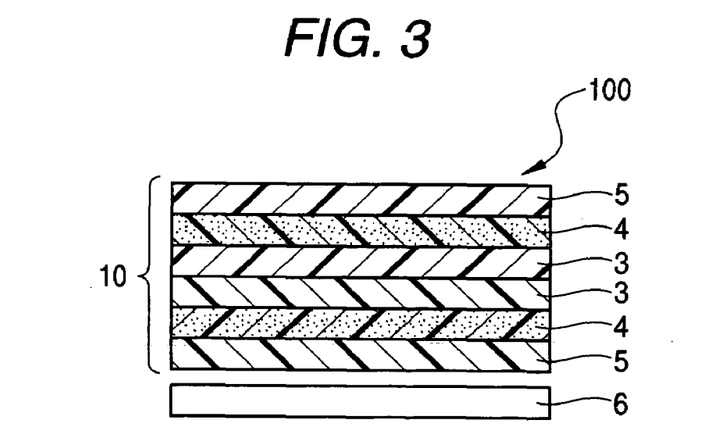
FIG. 3 is a cross-sectional view of one embodiment of the image display device of the invention.

The obliquely oriented film according to the invention may be preferably used for manufacturing image display devices such as liquid crystal display devices (LCD), EL display devices (ELD), and plasma display devices (PDP). FIG. 3 shows one embodiment of the image display device of the invention. The image display device 100 is manufactured from a member 6 corresponding to a liquid crystal cell or an organic EL illuminant to be mentioned below and the obliquely oriented film 10 in FIG. 2 arranged on the member 6.

The obliquely oriented film of the invention may be preferably used for manufacturing various image display devices such as liquid crystal display devices (LCD). For example, the film may be used in reflective type or trans-flective type or transparent/reflective dual type liquid crystal display devices wherein a polarizing plate has been located at one side or both sides of the liquid crystal cell. The liquid crystal cell substrate may be either of a plastic substrate or a glass substrate. The liquid crystal cell for manufacturing the liquid crystal display devices may be any one, and suitable types of the liquid crystal cell, such as active matrix-driven types including thin film transistor type as a representative and simple matrix-driven types including twisted nematic type and super twisted nematic type as representatives may be used.

When the retardation plate or the other optical films comprising the obliquely oriented film is installed in both sides of the liquid crystal cell, they may be of the same type or of different type. Furthermore, in assembling a liquid crystal display device, suitable parts, such as a prism array, a lens array sheet, an optical diffusing plate, and a backlight, may be installed in suitable position as one layer or two or more layers.

Subsequently, an organic electroluminescence display device (organic ELD) will be explained. Generally, in organic ELD, a transparent electrode, an organic luminescence layer and a metal electrode are laminated on a transparent substrate in an order configuring an illuminant (organic electroluminescence illuminant). Here, an organic luminescence layer is a laminated material of various organic thin films, and many constitutions with various combination are known, for example, a laminated material of a hole-injecting layer comprising a triphenylamine derivative or the like and a luminescence layer comprising a fluorescent organic solid, such as anthracene; a laminated material comprising such a luminescence layer and an electron-injecting layer comprising a perylene derivative or the like; a laminated material of these hole-injecting layers, luminescence layer, and electron-injecting layer; and the like.

An organic EL display device emits light based on a principle that positive hole and electron are injected into an organic luminescence layer by applying voltage between a transparent electrode and a metal electrode, the energy produced by recombination of these positive holes and electrons excites a fluorescent substance, and subsequently light is emitted when the excited fluorescent substance returns to ground state. A mechanism called recombination which takes place in an intermediate process is the same as a mechanism in common diodes, and, as is expected, there is a strong nonlinearity between electric current and luminescence intensity which is derived from rectification nature to applied voltage.

In an organic ELD, in order to take out luminescence in an organic luminescence layer, at least one electrode must be transparent. The transparent electrode usually uses a transparent electrode made of a transparent electric conductor, such as indium tin oxide (ITO), as a positive electrode. On the other hand, in order to make electronic injection easier and to increase luminescence efficiency, it is important that a substance with small work function is used for a negative electrode, and metal electrodes, such as Mg—Ag and Al—Li, are usually used.

In organic ELD of such a configuration, an organic luminescence layer is formed by a very thin film having a thickness of about 10 nm in thickness. For this reason, light is transmitted nearly completely through organic luminescence layer as through transparent electrode. Consequently, since the light that enters, when light is not emitted, as incident light from the surface of a transparent substrate, is transmitted through the transparent electrode and the organic luminescence layer, and then is reflected by a metal electrode appears in front surface side of the transparent substrate again, a display side of the organic ELD looks like mirror, if viewed from outside.

In an organic ELD containing an organic electroluminescence illuminant equipped with a transparent electrode on a surface side of the organic luminescence layer that emits light by applying voltage and at the same time equipped with a metal electrode on a back side of the organic luminescence layer, a retardation plate may be installed between these transparent electrodes and a polarizing plate, while preparing the polarizing plate on the surface side of the transparent electrode.

Since the retardation film such as the obliquely oriented film of the invention and the polarizing plate have function polarizing the light that has entered as incident light from outside and has been reflected by the metal electrode, they have an effect of making the mirror surface of the metal electrode not visible from outside by the polarization action. When a retardation plate is configured with a quarter wavelength plate and the angle between the two polarization directions of the polarizing plate and the retardation film is adjusted to $\pi/4$, the mirror surface of the metal electrode may be completely covered.

This means that only linearly polarized light component of the external light that enters as incident light into this organic ELD is transmitted with the work of the polarizing plate. This linearly polarized light generally gives an elliptically polarized light by the retardation film, and especially the retardation film is a quarter wavelength plate, and moreover when the angle between the two polarization directions of the polarizing plate and the retardation film is adjusted to $\pi/4$, it gives a circularly polarized light.

This circularly polarized light is transmitted through the transparent substrate, the transparent electrode and the organic thin film, and is reflected by the metal electrode. Then, the light is transmitted through the organic thin film, the transparent electrode and the transparent substrate again, and is turned into a linearly polarized light again with the retardation film. And since this linearly polarized light lies at right angles to the polarization direction of the polarizing plate, it cannot be transmitted through the polarizing plate. As the result, the mirror surface of the metal electrode may be completely covered.

As mentioned above, in the invention, an obliquely oriented film or an obliquely oriented liquid crystal layer having a large degree of obliquity can be obtained by rubbing a homeotropically orienting substrate, then applying a homeotropically orienting liquid crystal composition or a photopolymerizable liquid crystal composition on the substrate, subjecting it to oblique orientation, and fixing the oblique orientation. This is attributable to the inference that the oblique orientation state is obtained by a small force induced by rubbing the substrate in the case that a state of homeotropic orientation is standard in the combination of the above homeotropically orienting liquid crystal composition and the above homeotropically orienting substrate where homeotropic orientation is easy to obtain.

EXAMPLES

The present invention is now illustrated in greater detail with reference to Examples and Comparative Examples, but it should be understood that the present invention is not to be construed as being limited thereto.

Example 1

Preparation of Liquid Crystal Coating Solution

Into 80 parts by weight of cyclohexanone were dissolved 20 parts by weight of a photopolymerizable liquid crystal composition exhibiting a nematic liquid crystal phase (PALIOCOLOR LC242, manufactured by BASF) and 3 parts by weight of a photopolymerization initiator (IRGACURE 907, manufactured by Ciba Specialty Chemicals).

Preparation of Obliquely Oriented Film

An isopropyl alcohol-2% butanol solution of ethyl silicate (manufactured by Colcoat: COLCOAT P) was applied on a polyethylene terephthalate (hereinafter referred to as PET) film substrate, and then dried under heating to form an alignment layer having a thickness of about 0.1 μm as a homeotropically orienting substrate. After the surface was subjected to a rubbing treatment with a rayon fabric, the above liquid crystal coating solution was applied thereon by means of a bar coater and dried at 90° C. for 5 minutes and then oriented. Thereafter, irradiation with a light of 1 mJ/cm$^2$ was carried out by means of a metal halide lamp to obtain an obliquely oriented film with an obliquely oriented liquid crystal layer having a thickness of about 2 μm. An adhesive layer comprising an acrylic adhesive was formed beforehand on a triacetyl cellulose (hereinafter referred to as TAC) film having a thickness of 50 μm and the above obliquely oriented film was adhered thereto at the obliquely oriented liquid crystal layer side through the adhesive layer. Thereafter, the homeotropically orienting substrate was peeled off at the interface between the substrate and the obliquely oriented liquid crystal layer to obtain an obliquely oriented film comprising the TAC film, the adhesive layer, and the obliquely oriented liquid crystal layer.

Example 2

A liquid crystal coating solution was prepared in the same manner as in Example 1 (Preparation of liquid crystal coating solution). Thereafter, in (Preparation of obliquely oriented film), an obliquely oriented film was obtained in the same manner as in Example 1 except that 3-acryloxypropyltrimethoxysilane (manufactured by Shin-Etsu Chemical Co., Ltd.: KBM5103) was applied and then dried under heating to form an alignment layer having a thickness of about 0.1 μm as a homeotropically orienting substrate.

Example 3

A liquid crystal coating solution was prepared in the same manner as in Example 1 (Preparation of liquid crystal coating solution). Thereafter, in (Preparation of obliquely oriented film), after the surface of a norbornene type film (manufactured by Zeon Corporation: ZEONOR) was subjected to a rubbing treatment with a rayon fabric, the above liquid crystal coating solution was applied thereon by means of a bar coater and dried at 90° C. for 5 minutes and then oriented. Thereafter, irradiation with a light of 1 mJ/cm$^2$ was carried out by means of a metal halide lamp to obtain an obliquely oriented film with an obliquely oriented liquid crystal layer having a thickness of about 2 μm as a homeotropically orienting substrate without transferring it to the TAC film.

Example 4

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 1. On the obliquely oriented liquid crystal layer, the above liquid crystal coating solution was further applied by means of a bar coater and dried at 90° C. for 5 minutes and then oriented. Then, irradiation with a light of 1 mJ/cm$^2$ was carried out by means of a metal halide lamp to obtain an obliquely oriented film with a two-layer laminated obliquely oriented liquid crystal layer having a total thickness of about 4 μm. Thereafter, the film was transferred to the TAC film in the same manner as in Example 1 to obtain an obliquely oriented film comprising the TAC film, the adhesive layer, and the obliquely oriented liquid crystal layer.

Example 5

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 2. On the obliquely oriented liquid crystal layer, the above liquid crystal coating solution was further applied by means of a bar coater and dried at 90° C. for 5 minutes and then oriented. Then, irradiation with a light of 1 mJ/cm$^2$ was carried out by means of a metal halide lamp to obtain an obliquely oriented film with a two-layer laminated obliquely oriented liquid crystal layer having a total thickness of about 4 μm. Thereafter, the film was transferred to the TAC film in the same manner as in Example 1 to obtain an obliquely oriented film comprising the TAC film, the adhesive layer, and the obliquely oriented liquid crystal layer.

Example 6

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 3. On the obliquely oriented liquid-crystal layer, the above liquid crystal coating solution was further applied by means of a bar coater and dried at 90° C. for 5 minutes and then oriented. Then, irradiation with a light of 1 mJ/cm$^2$ was carried out by means of a metal halide lamp to obtain an obliquely oriented film with a two-layer laminated obliquely oriented liquid crystal layer having a total thickness of about 4 μm.

Example 7

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 1. On the obliquely oriented liquid crystal layer, the above liquid crystal coating solution was further applied by means of a bar coater and dried at 90° C. for 5 minutes and then oriented. Then, irradiation with a light of 1 mJ/cm$^2$ was carried out by means of a metal halide lamp to laminate a second layer. Furthermore, the same operations as in the case of the second layer were carried out to obtain an obliquely oriented film with the obliquely oriented liquid crystal layer, which has a third layer laminated thereon, having a total thickness of about 6 μm. Thereafter, the film was transferred to the TAC film in the same manner as in Example 1 to obtain an obliquely oriented film comprising the TAC film, the adhesive layer, and the obliquely oriented liquid crystal layer.

Example 8

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 2. On the obliquely oriented liquid crystal layer, the above liquid crystal coating solution was further applied by means of a bar coater and dried at 90° C. for 5 minutes and then oriented. Then, irradiation with a light of 1 mJ/cm$^2$ was carried out by means of a metal halide lamp to laminate a second layer. Furthermore, the same operations as in the case of the second layer were carried out to obtain an obliquely oriented film with the obliquely oriented liquid crystal layer, which has a third layer laminated thereon, having a total thickness of about 6 μm. Thereafter, the film was transferred to the TAC film in the same manner as in Example 1 to obtain an obliquely oriented film comprising the TAC film, the adhesive layer, and the obliquely oriented liquid crystal layer.

Example 9

A liquid crystal coating solution was prepared in the same manner as in Example 1 (Preparation of liquid crystal coating solution). Thereafter, in (Preparation of obliquely oriented film), an obliquely oriented liquid crystal layer having a thickness of about 2 μm was formed in the same manner as in Example 3. On the obliquely oriented liquid crystal layer, the above liquid crystal coating solution was further applied by means of a bar coater and dried at 90° C. for 5 minutes and then oriented. Then, irradiation with a light of 1 mJ/cm² was carried out by means of a metal halide lamp to laminate a second layer. Furthermore, the same operations as in the case of the second layer were carried out to obtain an obliquely oriented film with the obliquely oriented liquid crystal layer, which has a third layer laminated thereon, having a total thickness of about 6 μm. Thereafter, the film was transferred to the TAC film in the same manner as in Example 1 to obtain an obliquely oriented film comprising the TAC film, the adhesive layer, and the obliquely oriented liquid crystal layer.

Example 10

Preparation of Liquid Crystal Coating Solution (Formula 6)

Into 80 parts by weight of cyclohexanone were dissolved 5 parts by weight of a side chain-type liquid crystal polymer represented by the above formula 6 (wherein the numerals represent mol % of the monomer units and indicated in block letters for convenience of explanation; weight average molecular weight: 5,000), 20 parts by weight of a photopolymerizable liquid crystal composition exhibiting a nematic liquid crystal phase (PALIOCOLOR LC242, manufactured by BASF), and 3 parts by weight of a photopolymerization initiator (IRGACURE 907, manufactured by Ciba Specialty Chemicals).

Example 11

After a liquid crystal coating solution was prepared in the same manner as in Example 10 (Preparation of liquid crystal coating solution), an obliquely oriented film was obtained in the same manner as in Example 2 in (Preparation of obliquely oriented film).

Example 12

After a liquid crystal coating solution was prepared in the same manner as in Example 10 (Preparation of liquid crystal coating solution), an obliquely oriented film was obtained in the same manner as in Example 4 in (Preparation of obliquely oriented film).

Example 13

After a liquid crystal coating solution was prepared in the same manner as in Example 10 (Preparation of liquid crystal coating solution), an obliquely oriented film was obtained in the same manner as in Example 5 in (Preparation of obliquely oriented film).

Comparative Example 1

A liquid crystal coating solution was prepared in the same manner as in Example 1 (Preparation of liquid crystal coating solution) Thereafter, in (Preparation of obliquely oriented film), the liquid crystal coating solution was directly applied on the PET film substrate by means of a bar coater without installing any alignment layer and without rubbing treatment and then the same operations as in Example 1 were carried out to obtain an optical film comprising the TAC film, the adhesive layer, and the obliquely oriented liquid crystal layer.

Comparative Example 2

A liquid crystal coating solution was prepared in the same manner as in Example 1 (Preparation of liquid crystal coating solution). Thereafter, in (Preparation of obliquely oriented film), a 5% by weight aqueous solution of polyvinyl alcohol (NH-18, manufactured by JSR Co., Ltd.) was applied on the PET substrate by means of a bar coater and then dried under heating at 150° C. for 30 minutes, followed by rubbing treatment with a rayon fabric. Thereafter, the same operations as in Example 1 were carried out to obtain an optical film comprising the TAC film, the adhesive layer, and the obliquely oriented liquid crystal layer.

Comparative Example 3

A liquid crystal coating solution was prepared in the same manner as in Example 1 (Preparation of liquid crystal coating solution). Thereafter, in (Preparation of obliquely oriented film), acryloxypropyltrimethoxysilane (KBM5103: manufactured by Shin-Etsu Chemical Co., Ltd.) was applied on the PET substrate and then dried under heating to obtain an alignment layer having a thickness of about 0.1 μm. Then, the same operations as in Example 1 were carried out, without subjecting to rubbing treatment on the alignment layer, to obtain an optical film comprising the TAC film, the adhesive layer, and the obliquely oriented liquid crystal layer.

Measurement of Degree of Obliquity

The retardation values of the prepared obliquely oriented films were measured as front values and values when inclined ±30° in the slow axis direction using an automatic birefringence measuring apparatus (KOBRA21ADH: manufactured by Oji Scientific Instruments). Based on the measured retardation values, each degree of obliquity was determined according to the following expression:

Degree of obliquity=($|\Delta nd(-30)-\Delta nd(+30)|/\Delta nd(0)$)×100 wherein $\Delta nd(0)$ is the front retardation, $\Delta nd(+30)$ and $\Delta nd(-30)$ are retardations in a direction inclined at ±30° toward a slow axis, respectively.

Table 1 shows evaluation results in the above Examples and Comparative Examples.

TABLE 1

| | $\Delta nd(-30)$ | $\Delta nd(0)$ | $\Delta nd(+30)$ | Degree of obliquity |
|---|---|---|---|---|
| Example 1 | 273 | 132 | 12 | 198 |
| Example 2 | 245 | 126 | 22 | 177 |
| Example 3 | 302 | 143 | 37 | 185 |
| Example 4 | 632 | 148 | 25 | 410 |
| Example 5 | 469 | 141 | 27 | 313 |

TABLE 1-continued

|  | Δnd(−30) | Δnd(0) | Δnd(+30) | Degree of obliquity |
|---|---|---|---|---|
| Example 6 | 523 | 138 | 33 | 355 |
| Example 7 | 872 | 112 | 39 | 744 |
| Example 8 | 796 | 128 | 26 | 602 |
| Example 9 | 768 | 132 | 35 | 555 |
| Example 10 | 212 | 108 | 23 | 175 |
| Example 11 | 175 | 93 | 28 | 158 |
| Example 12 | 438 | 152 | 36 | 264 |
| Example 13 | 405 | 146 | 39 | 251 |
| Comparative Example 1 | 139 | 145 | 139 | 0 |
| Comparative Example 2 | 143 | 150 | 142 | 1 |
| Comparative Example 3 | 25 | 0.5 | 25 | 0 |

As is apparent from the results in Table 1, an obliquely oriented film having a large degree of obliquity is obtained by rubbing a homeotropically orienting substrate and also forming an obliquely oriented liquid crystal layer containing a homeotropically orienting liquid crystal composition or a photopolymerizable liquid crystal composition. Furthermore, by laminating two or more layers of the above obliquely oriented liquid crystal layer, an obliquely oriented film having a larger degree of obliquity can be stably obtained.

The present application is based on Japanese Patent Application Nos. 2003-060534 filed on Mar. 6, 2003 and No. 2004-058941 filed on Mar. 3, 2004, and the contents thereof are incorporated herein by reference.

What is claimed is:

1. A method for producing an obliquely oriented film, comprising:
   performing a rubbing treatment on a homeotropically orienting substrate comprising a polymer film having a norbornene structure or a glass substrate; and, after the rubbing treatment,
   applying a liquid crystal coating solution containing at least one of a homeotropically orienting liquid crystal composition and a photopolymerizable liquid crystal composition on the homeotropically orienting substrate to form an obliquely oriented liquid crystal layer.

2. A method for producing an obliquely oriented film, comprising:
   preparing, before a rubbing treatment, a homeotropically orienting substrate comprising an alignment layer containing a glassy macromolecule, a silane coupling agent or a surfactant, on which the homeotropically orienting liquid crystal composition is homeotropically aligned, disposed on a polymer film;
   performing the rubbing treatment on the homeotropically orienting substrate; and
   applying a liquid crystal coating solution containing at least one of a homeotropically orienting liquid crystal composition and a photopolymerizable liquid crystal composition on the homeotropically orienting substrate to form an obliquely oriented liquid crystal layer.

3. The method for producing an obliquely oriented film according to claim 1,
   wherein, after forming the obliquely oriented liquid crystal layer, a plurality of obliquely oriented liquid crystal layers are formed by applying the liquid crystal coating solution.

4. The method for producing an obliquely oriented film according to claim 1, which further comprises:
   laminating the obliquely oriented liquid crystal layer and an optical film through at least one adhesive layer; and removing the homeotropically orienting substrate.

5. An obliquely oriented film obtained by the method for producing an obliquely oriented film according to claim 1, wherein a degree of obliquity is 30 or more, provided that the degree of obliquity is calculated as $$(|\Delta nd(-30) - \Delta nd(+30)|/\Delta nd(0)) \times 100$$

wherein Δnd(0) is the front retardation, Δnd(+30) and Δnd(−30) are retardations in a direction inclined at ±30° toward a slow axis, respectively.

6. The obliquely oriented film according to claim 5, wherein the degree of obliquity is 50 to 500.

7. The obliquely oriented film according to claim 6, wherein the degree of obliquity is 150 to 250.

8. An obliquely oriented film obtained by the method for producing an obliquely oriented film according to claim 3, wherein a degree of obliquity is 30 or more, provided that the degree of obliquity is calculated as $$(|\Delta nd(-30) - \Delta nd(+30)|/\Delta nd(0)) \times 100$$

wherein Δnd(0) is the front retardation, Δnd(+30) and Δnd(−30) are retardations in a direction inclined at ±30° toward a slow axis, respectively.

9. The obliquely oriented film according to claim 8, wherein the degree of obliquity is 50 to 1000.

10. The obliquely oriented film according to claim 9, wherein the degree of obliquity is 150 to 800.

11. The obliquely oriented film according to claim 5, wherein the thickness of the obliquely oriented liquid crystal layer is 1 to 10 μm.

12. The obliquely oriented film according to claim 5, wherein an oblique angle of a nematic liquid crystal molecule of the obliquely oriented liquid crystal layer is 1° to 85° with respect to the direction normal to a surface of the homeotropically orienting substrate.

13. The obliquely oriented film according to claim 5, which further comprises an optical film.

14. The obliquely oriented film according to claim 8, which further comprises an optical film.

15. An image display device having the obliquely oriented film according to claim 5.

16. An image display device having the obliquely oriented film according to claim 13.

17. The method for producing an obliquely oriented film according to claim 2,
   wherein, after forming the obliquely oriented liquid crystal layer, a plurality of obliquely oriented liquid crystal layers are formed by applying the liquid crystal coating solution.

18. The method for producing an obliquely oriented film according to claim 2, which further comprises:
   laminating the obliquely oriented liquid crystal layer and an optical film through at least one adhesive layer; and removing the homeotropically orienting substrate.

19. An obliquely oriented film obtained by the method for producing an obliquely oriented film according to claim 2, wherein a degree of obliquity is 30 or more, provided that the degree of obliquity is calculated as $$(|\Delta nd(-30) - \Delta nd(+30)|/\Delta nd(0)) \times 100$$

wherein Δnd(0) is the front retardation, Δnd(+30) and Δnd(−30) are retardations in a direction inclined at ±30° toward a slow axis, respectively.

* * * * *